(12) United States Patent
Takigawa et al.

(10) Patent No.: US 6,389,082 B1
(45) Date of Patent: May 14, 2002

(54) RECEIVER

(75) Inventors: Masami Takigawa; Hitonobu Furukawa, both of Osaka; Akira Mishima, Gifu; Hiroaki Ozeki, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 140 days.

(21) Appl. No.: 09/612,040

(22) Filed: Jul. 7, 2000

(30) Foreign Application Priority Data

Jul. 9, 1999 (JP) .......................................... 11-195606

(51) Int. Cl.[7] .............................................. H04L 27/06
(52) U.S. Cl. ...................... 375/316; 375/344; 329/304
(58) Field of Search ................................. 375/316, 324, 375/340, 344, 326; 329/304

(56) References Cited

U.S. PATENT DOCUMENTS 5,325,401 A  *  6/1994  Halik et al. .................. 375/329
5,699,385 A  * 12/1997  D'Sylva et al. ............. 375/344
6,075,829 A  *  6/2000  Hayashi et al. ............. 375/344

FOREIGN PATENT DOCUMENTS

JP          62-136152          6/1987

* cited by examiner

*Primary Examiner*—Temesghen Ghebretinsae
(74) *Attorney, Agent, or Firm*—Ratner & Prestia

(57) ABSTRACT

In a receiver supporting multiple data rates, a sweep control range is calculated on the basis of the data rate of the carrier of the channel to be selected and sweep control is executed on the oscillated frequency by VCO 8 within the sweeping frequency range so that synchronization locking to the carrier is attained and thereby an erroneous channel selection is prevented.

6 Claims, 4 Drawing Sheets

RECEIVER

BACKGROUND OF THE INVENTION

1. Field of the Invention

The present invention relates to a receiver for receiving a digital modulated signal such as a QPSK signal.

2. Description of the Related Art

In digital broadcast making use of a communications satellite, video and audio are broadcasted by having the carrier subjected to digital modulation. In the communications satellite (CS) audio broadcast, digital modulation having a data rate of 24.576 Mbps is used. In video-audio broadcast practiced in Japan, digital modulation having a data rate of 42.192 Mbps is used.

The radio wave from the satellite is a frequency band of 11.2 GHz. The radio wave received by an antenna is converted by a converter into a first intermediate frequency of a frequency band of 1–2 GHz. Conventionally, a dielectric resonator is used as the local oscillator in the converter. Since the dielectric resonator lacks in stability, the frequency given by the local oscillator sometimes exhibits a drift of around ±2 MHz. Therefore, to tune to the first intermediate frequency signal from the antenna, the voltage-controlled oscillator (VCO) control loop requires a synchronization locking control means for a frequency range of at least exceeding ±2 MHz or, preferably, about ±5 MHz.

A conventional art example for solving such a problem is disclosed in Japanese Laid-open Patent No. S 62-136152.

FIG. 5 is a block diagram showing a conventional receiver for a QPSK modulated signal.

The conventional art example will be described with reference to FIG. 5.

Mixer 102 mixes a signal of a frequency band of 11.2 GHz received by antenna 101 with an output signal of local oscillator 103 to output a first intermediate frequency signal of a frequency band of 1 GHz. Multiplier 102 and local oscillator 103 constitute a converter attached to the antenna.

Mixer 104 mixes the first intermediate frequency signal with an output signal of local oscillator 105 for channel selection and thereby outputs a second intermediate frequency signal of a frequency band of 400 MHz.

The second intermediate frequency signal limited for bandwidth by bandpass filter (BPF) 106 is supplied to Quardrature Phase Shift Keying (QPSK) demodulator 200.

QPSK demodulator 200 is made up of detectors 201 and 202, phase shifter 203, waveform shapers 204 and 205, multipliers 206 and 207, subtractor 208, adder 209, low-pass filter (LPF) 210 and voltage-controlled oscillator (VCO) 211.

Phase shifter 203 shifts 90 degrees the phase of the output signal of VCO 211.

Adder 209 adds the output signal of low-frequency oscillator 110, passed through switch 111, to the output signal of subtractor 208.

Switch 111 is closed when demodulator 200 is in its asynchronous state, while it is opened when demodulator 200 is in its synchronous state.

When demodulator 200 is brought into its synchronous state, a detection signal is delivered from synchronous pattern detector (SPD) 109 in digital signal processor (DSP) 108. Switch 111 is controlled by this detection signal.

The capture range of QPSK demodulator 200 is around ±500 kHz, while the lock range thereof is ±several MHz.

When local oscillator 103 is drifting several MHz, QPSK demodulator 200 sometimes becomes unable to perform synchronization locking. In such case, switch 111 is closed and a low-frequency signal is added to a phase error signal, so that VCO 211 is swept and, thereby, synchronization locking control is performed.

This makes use of the characteristic of the VCO control loop that it has a wide lock range while it has a narrow capture range, and, hence, the sweeping expands the apparent capture range of the loop. By means of such a configuration, even when the carrier frequency is off-centered, it can be captured and demodulated.

Recently, as applications making use of communications satellites, uses of broadcast communications, such as inter-company communications, have become increased. In such communications applications, not so large an amount of transmitted data is required as in ordinary video broadcasting. Therefore, the data rate is 8 Mbps, 4 Mbps, or so, which is considerably lower than the data rate around 40 Mbps in ordinary broadcasting.

Since the carrier bandwidth is in direct proportion to the data rate, the space between adjacent carriers can be set narrower according as the data rate becomes lower. Hence, efficiency in utilization of the frequency can be improved.

When the data rate is 8 Mbps, the distance between channels in the carrier disposition is about 5.4 MHz, while it is about 2.7 MHz when the data rate is 4 Mbps.

If synchronization locking control over a frequency range of ±5 MHz, in accordance with the data rate for conventional broadcasting, is applied to a carrier at a low data rate of 8 Mbps or 4 Mbps, there arises a problem that a wrong channel comes to be selected.

SUMMARY OF THE INVENTION

The present invention was made to solve the above mentioned problem encountered in a receiver arranged to support multiple data rates. In order to solve the problem, the receiver of the present invention comprises:

tuning means for converting a desired modulated carrier wave selected from a first intermediate frequency signal received by an antenna into a second intermediate frequency signal;

a bandpass filter for limiting the second intermediate frequency signal for bandwidth;

orthogonal detecting means supplied with an output signal of the bandpass filter for delivering an I baseband signal and a Q baseband signal orthogonal with each other;

a voltage-controlled oscillator for feeding a signal for detection to the orthogonal detecting means;

AD converters for converting the I and Q baseband signals into digital signals;

digital demodulator means supplied with the I and Q baseband signals digitized by the AD converters for delivering a frequency error signal, a synchronism detection signal, and a demodulated signal;

sweeping control means supplied with the frequency error signal and sweeping data for delivering a control voltage of the voltage-controlled oscillator; and a microcomputer supplied with a channel select command including carrier wave information and data rate information of the first intermediate frequency, the frequency error signal, and the synchronism detection signal, in which the microcomputer delivers a tuning frequency setting value to the tuning means, and delivers the sweeping data to the sweeping control means.

By virtue of the structure as described above, the sweeping frequency range of a desired carrier is calculated on the basis of the data rate of the carrier of the selected channel and sweep control is executed within the thus calculated sweeping frequency range so that synchronization locking to the carrier is attained and, thereby, an erroneous channel selection can be prevented.

DESCRIPTION OF THE PREFERRED EMBODIMENT

An exemplary embodiment of the present invention will be described with reference to the accompanying drawings.

Figure 1:
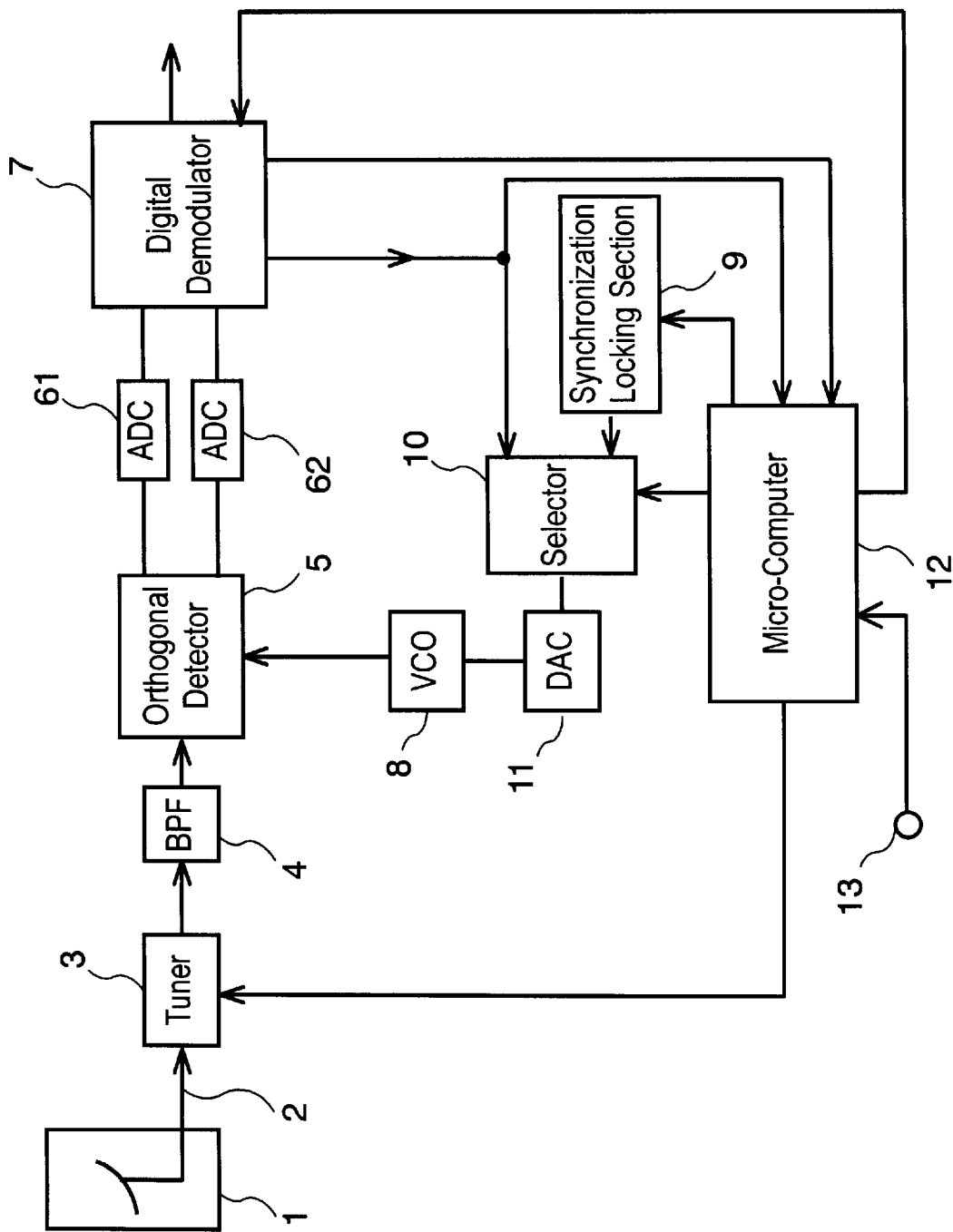
FIG. 1 is a block diagram showing a configuration of a receiver as an exemplary embodiment of the present invention.

FIG. 1 is a block diagram showing a receiver according to the embodiment of the invention.

With reference to FIG. 1, antenna portion 1 converts a received radio wave into a first intermediate frequency signal (of a frequency band of 1 GHz–2 GHz) and delivers the signal.

Figure 2:
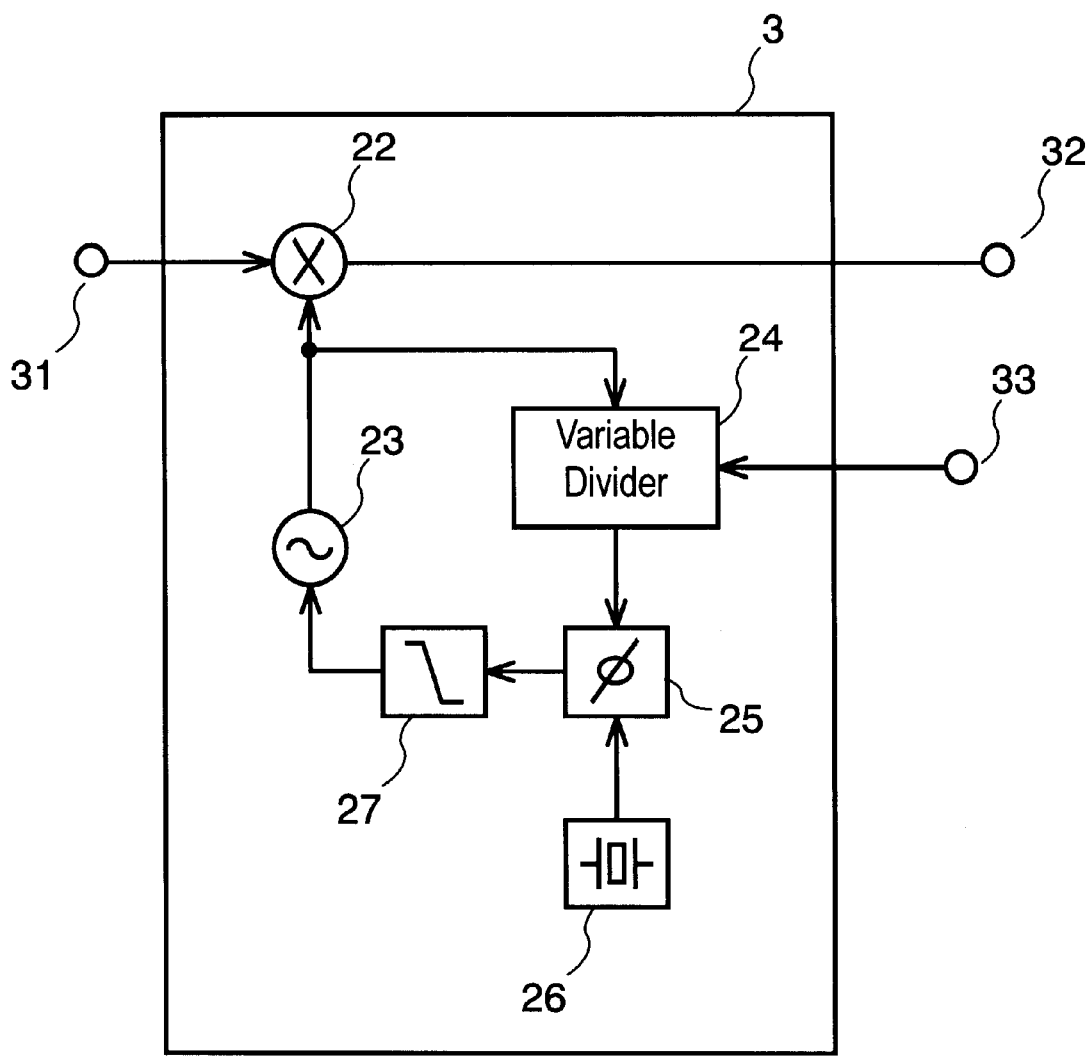
FIG. 2 is a block diagram showing a configuration of a tuner means in the receiver.

As tuner 3, that of a PLL synthesizer type as shown in FIG. 2 is generally used. Tuner 3, as shown in FIG. 2 is made up of mixer 22, local oscillator 23 formed of a VCO, variable divider (programmable divider) 24, phase comparator 25, reference oscillator 26, and loop filter 27. The first intermediate frequency signal is supplied to terminal 31, while a tuning frequency setting value from a microcomputer is supplied to terminal 33. The frequency dividing value of variable divider 24 is established in accordance with the tuning frequency setting value. As a result, a desired carrier frequency is selected and the selected second intermediate frequency signal of 479.5 MHz is delivered to terminal 32.

The second intermediate frequency signal is limited for bandwidth in bandpass filter (BPF) 4 and supplied to orthogonal detector 5.

Orthogonal detector 5 uses the output signal of VCO 8 to convert the second intermediate frequency signal into an I baseband signal (hereinafter called "I signal") and a Q baseband signal (hereinafter called "Q signal") which are 90° out of phase with each other. The I signal and Q signal are converted by ADC 61 and 62, respectively, into digital signals and the same are supplied to digital demodulator 7. Digital demodulator 7 is generally formed of an LSI.

Digital demodulator 7 demodulates the received signals and delivers the demodulated signal. Demodulator 7 also delivers a synchronism detection signal, which is at a high level when the intermediate frequency signal and the output signal of VCO 8 are in phase and at a low level when they are out of phase, and a frequency error signal as the control voltage for VCO 8.

The frequency error signal is passed through selector circuit 10 constituting sweeping controller and, then, converted by DAC 11 into an analog signal for controlling the oscillation frequency of VCO 8.

Channel selection information, which includes carrier frequency information and data rate information of a selected channel, is supplied to microcomputer 12 through terminal 13. Microcomputer 12 performs the following functions:

(1) to set the value of tuning frequency in tuner 3;

(2) to set the value of data rate of the selected channel in demodulator 7; and (3) to set initial values in synchronization locking section 9 constituting sweeping controller.

Microcomputer 12 identifies that the synchronism detection signal is at a high level and confirms that channel selection has been completed normally.

Even after the completion of channel selection, microcomputer 12 continues read of the frequency error information delivered from modulator 7. In this state, if a new channel select command is received, microcomputer 12 establishes the current frequency error signal in the synchronization locking section 9. Then, in accordance with the new channel select command, it sets up the tuning frequency in tuner 3 and sets up the data rate in demodulator 7.

When the synchronism detection signal is at a low level in the state where the A/D converted I signal and Q signal are fed into demodulator 7, microcomputer 12 performs the following operations (1)–(4) in order that the intermediate frequency signal and the output signal of VCO 8 synchronize with each other:

(1) Calculation of sweep-controlling frequency range.

The sweep-controlling frequency range is set to be the carrier disposition interval. The carrier disposition interval is assumed to be equal to the carrier bandwidth. Here, the carrier bandwidth is obtained from Equation 1, $$\text{carrier bandwidth} = (\text{data rate}) \times (1 + \text{roll-off rate}) \times \tfrac{1}{2} \qquad 1$$

where it is set such that roll-off rate=0.2.

In executing the sweep control, sweeping is carried out over the above-obtained frequency range on both sides of the intermediate frequency.

(2) Calculation of VCO-sweeping voltage range based on the sweeping frequency range.

Figure 3:
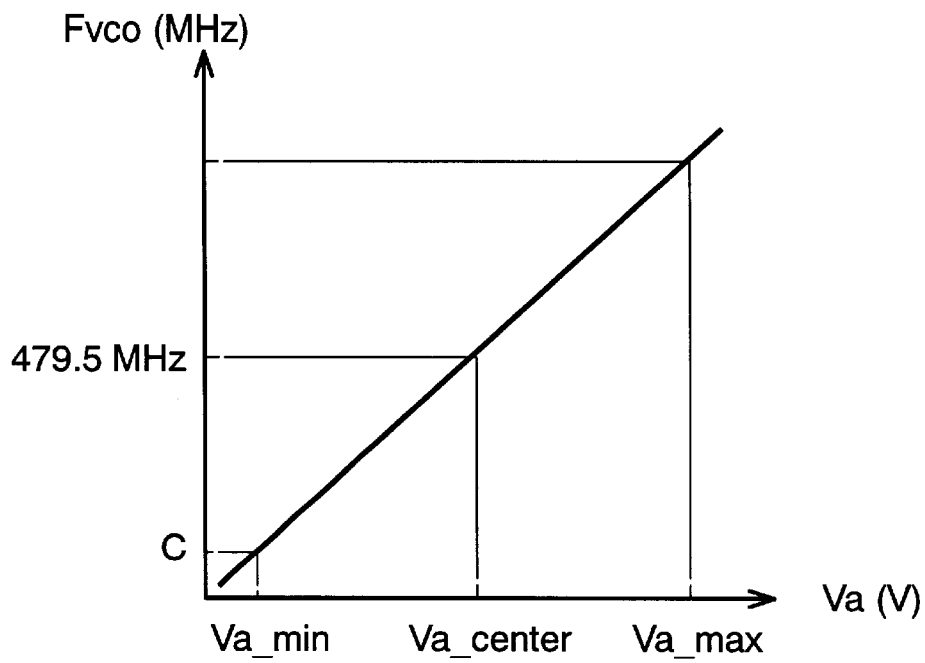
FIG. 3 is a characteristic diagram of a VCO in the receiver.

Relationship between VCO-oscillated frequency (Fvco (MHz)) and VCO controlling voltage (Va (v)) is expressed as equation 2.

$$Fvco = k\,Va + C \qquad 2$$

where k is the conversion sensitivity between input voltage to VCO and generated frequency therefrom, and C is the VCO-oscillated frequency at the time when the VCO controlling voltage is at its minimum (Va_min). (Refer to FIG. 3.)

When the sweeping frequency range is expressed as F=Fvco1–Fvco2 and the VCO sweeping voltage range is denoted by Va, then, Va is expressed as equation 3.

$$Va = F/k. \qquad 3$$

(3) Calculation of sweep-control-value range from the sweeping voltage range.

Figure 4:
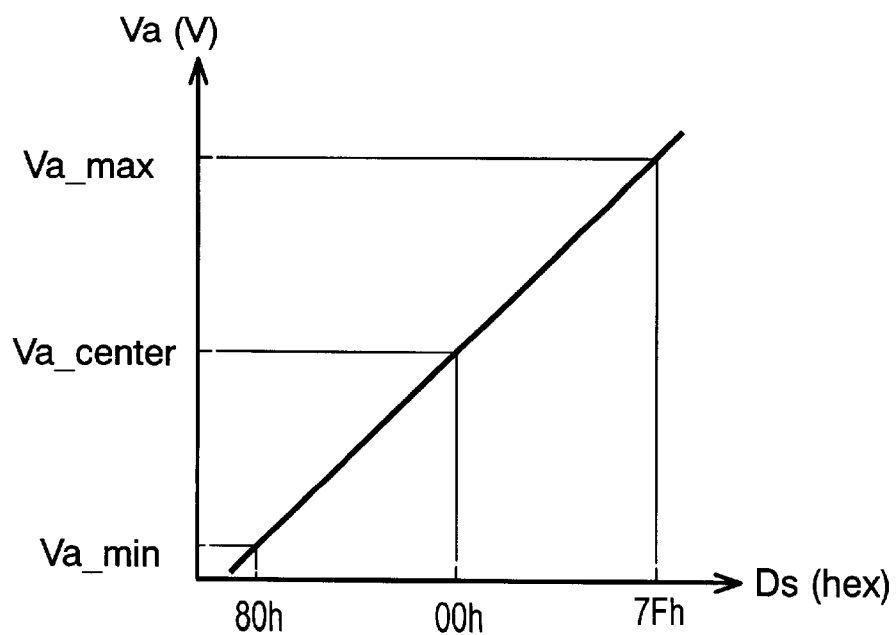
FIG. 4 is a characteristic diagram of a VCO in the receiver.
Figure 5:
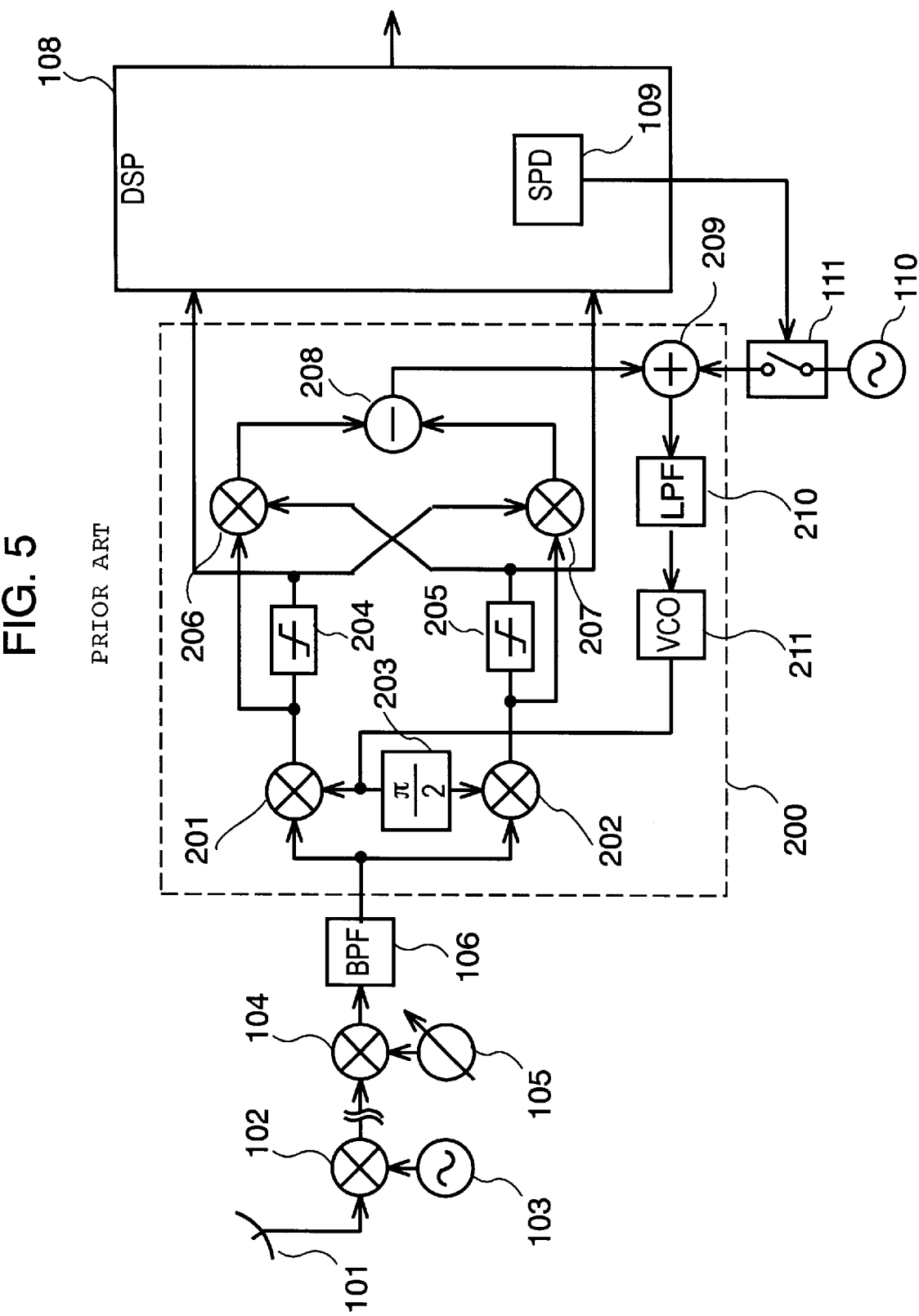
FIG. 5 is a block diagram showing a configuration of a conventional receiver.

As shown in FIG. 4, there is one-to-one correspondence between VCO sweeping voltage (Va) and the sweep-control-value (Ds). Here, the VCO sweep-control-value is given by two's-complement numbers, so that 00h corresponds to the center value of VCO controlling voltage (Va_center), 7Fh to the maximum value (Va_max), and 80h to the minimum value (Va_min).

Microcomputer has the correspondences between them recorded for example in a ROM table, and based on the correspondences, obtains the sweep-control-value range corresponding to the sweeping voltage range with the center value of the sweep-control-value range (corresponding to (Va_center)) in the center.

(4) Sweeping of VCO-oscillated frequency.

Microcomputer, in order to bring about a synchronized state by effecting synchronization locking to the carrier, sweeps VCO 8 through selector 10 and DAC 11 over the sweep-control-value range obtained in (3) above to attain synchronization locking to the carrier.

Hence, microcomputer splits up the sweep-control-value range obtained in (3) above into sections each thereof having the width of the sweep-control-value corresponding to the lock range and, thereupon, applies the sweep-control-value of each section to DAC 11 for allowing the locking to the carrier to be made.

In the case of QPSK modulated wave, for example, the lock range (MHz) to the carrier is equivalent to ⅛ of the data rate (Mbps).

By making sweep control as described in (1)–(4) above, synchronization locking to the carrier is achieved.

Although the above described embodiment has been constructed by a combination of a demodulating LSI and a VCO circuit, it is also possible to realize the VCO in a digital manner within the demodulating LSI so that the demodulating LSI contains all of the structure of the VCO control loop.

According to the present invention as described above, synchronization locking can be attained by calculating the sweeping frequency range for a searched carrier based on the data rate of the carrier of the selected channel and performing sweep control over the sweeping frequency range. Therefore, such an effect can be obtained that erroneous selection of other channels can be prevented.

What is claimed is:

1. A receiver comprising:

tuning means for converting a desired modulated carrier wave selected from a first intermediate frequency signal received by an antenna into a second intermediate frequency signal;

a bandpass filter for limiting the second intermediate frequency signal for bandwidth;

orthogonal detecting means supplied with an output signal of said bandpass filter for delivering an I baseband signal and a Q baseband signal orthogonal with each other;

a voltage-controlled oscillator for feeding a signal for detection to said orthogonal detecting means;

AD converters for converting the I and Q baseband signals into digital signals;

digital demodulating means supplied with the I and Q baseband signals digitized by said AD converters for delivering a frequency error signal, a synchronism detection signal, and a demodulated signal;

sweeping control means supplied with the frequency error signal and sweeping data for delivering a control voltage of said voltage-controlled oscillator; and a microcomputer supplied with a channel select command including carrier wave information and data rate information of the first intermediate frequency, the frequency error signal, and the synchronism detection signal, wherein said microcomputer delivers a tuning frequency setting value to said tuning means, and delivers the sweeping data to said sweeping control means.

2. The receiver according to claim 1, wherein said sweeping control means is made up of synchronous locking means supplied with the sweeping data for delivering a sweeping signal, and selection means for delivering selectively the frequency error signal or the sweeping signal in accordance with a select signal delivered from said microcomputer.

3. The receiver according to claim 1, wherein said microcomputer, in the event that the synchronism detection signal indicates an asynchronous state when a predetermined period of time has passed after it received the channel selection command and delivered a tuning frequency for channel selection to said tuning means, calculates the sweeping frequency range based on the data rate information and delivers the sweeping data.

4. The receiver according to claim 1, wherein said microcomputer, when a selected channel is changed by the channel selection command while the synchronism detection signal is indicating a synchronous state, delivers the frequency error signal value prior to the change of the selected channel as the sweeping data.

5. The receiver according to claim 2, wherein said microcomputer, in the event that the synchronism detection signal indicates an asynchronous state when a predetermined period of time has passed after it received the channel selection command and delivered a tuning frequency for channel selection to said tuning means, calculates the sweeping frequency range based on the data rate information and delivers the sweeping data.

6. The receiver according to claim 2, wherein said microcomputer, when a selected channel is changed by the channel selection command while the synchronism detection signal is indicating a synchronous state, delivers the frequency error signal value prior to the change of the selected channel as the sweeping data.

* * * * *